Sept. 23, 1952  J. J. GOUGH  2,611,849
TOASTER TIMER
Filed Oct. 4, 1947  2 SHEETS—SHEET 1
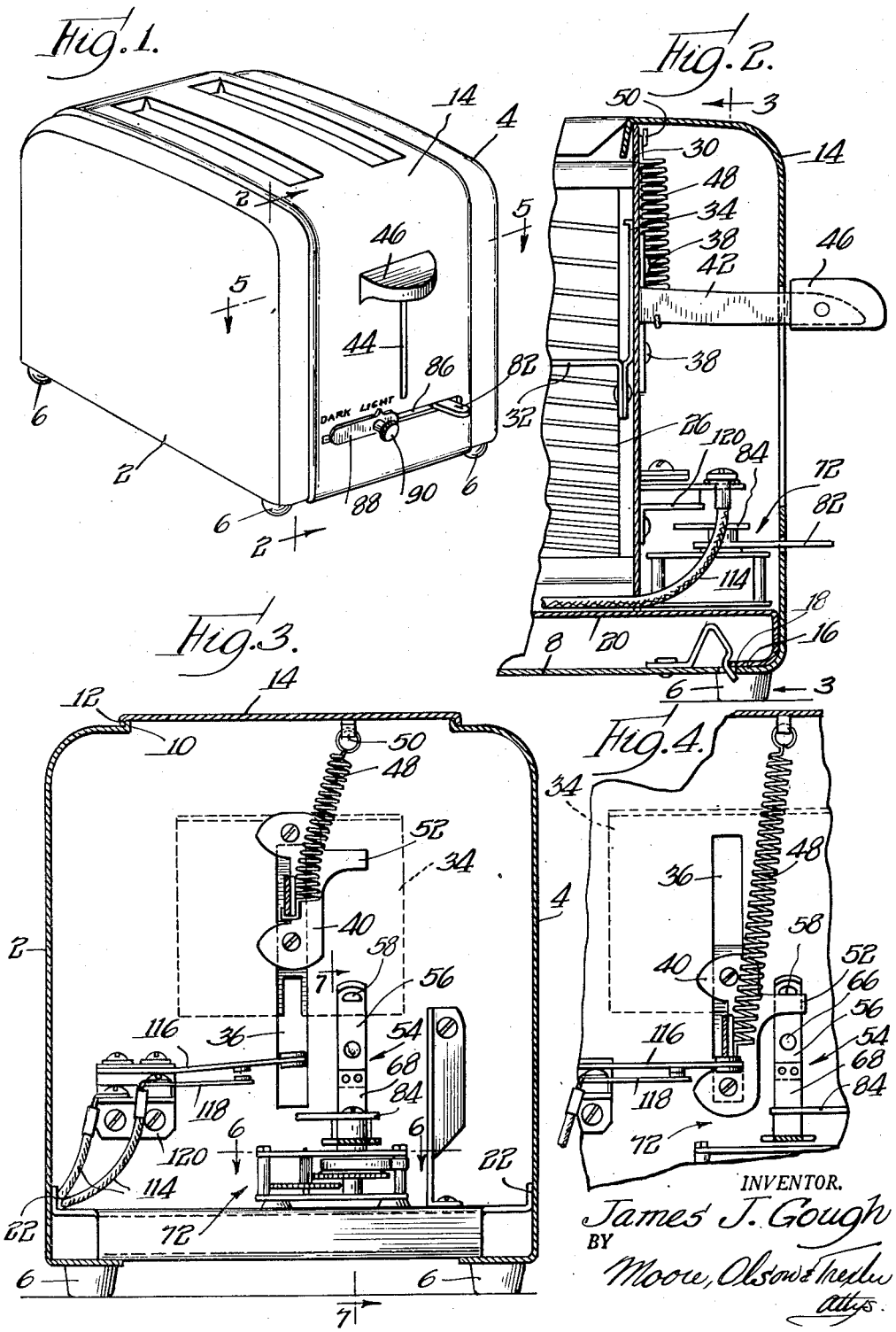
INVENTOR.
James J. Gough
BY
Moore, Olson & Trexler
Attys.

Sept. 23, 1952 J. J. GOUGH 2,611,849
TOASTER TIMER
Filed Oct. 4, 1947 2 SHEETS—SHEET 2
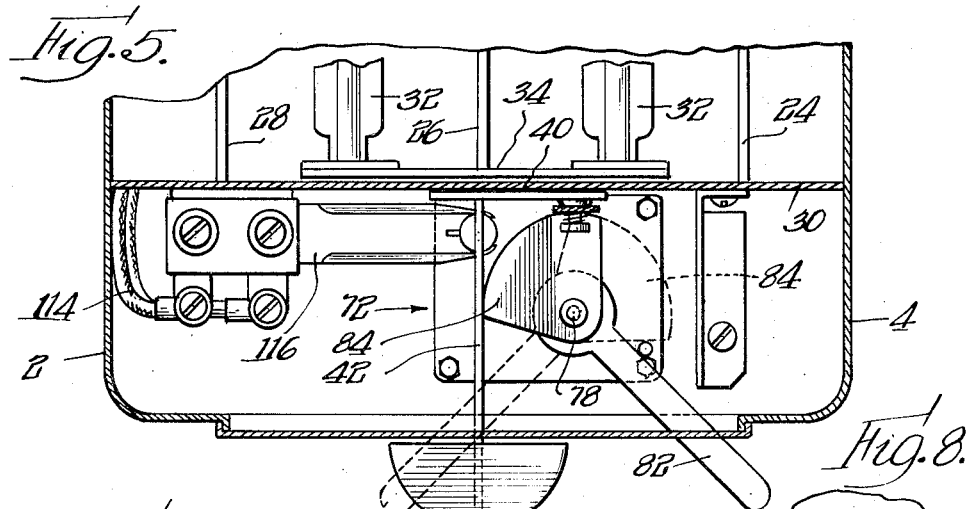
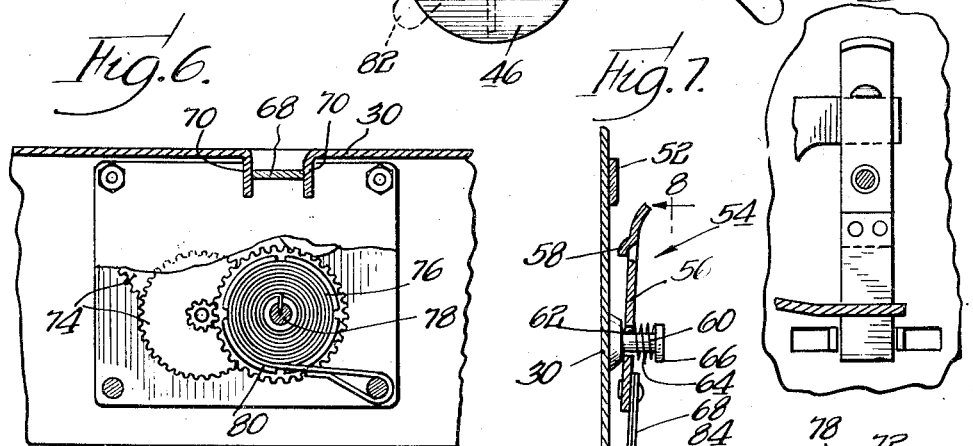
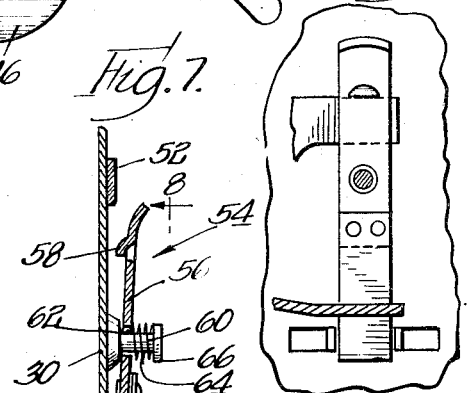
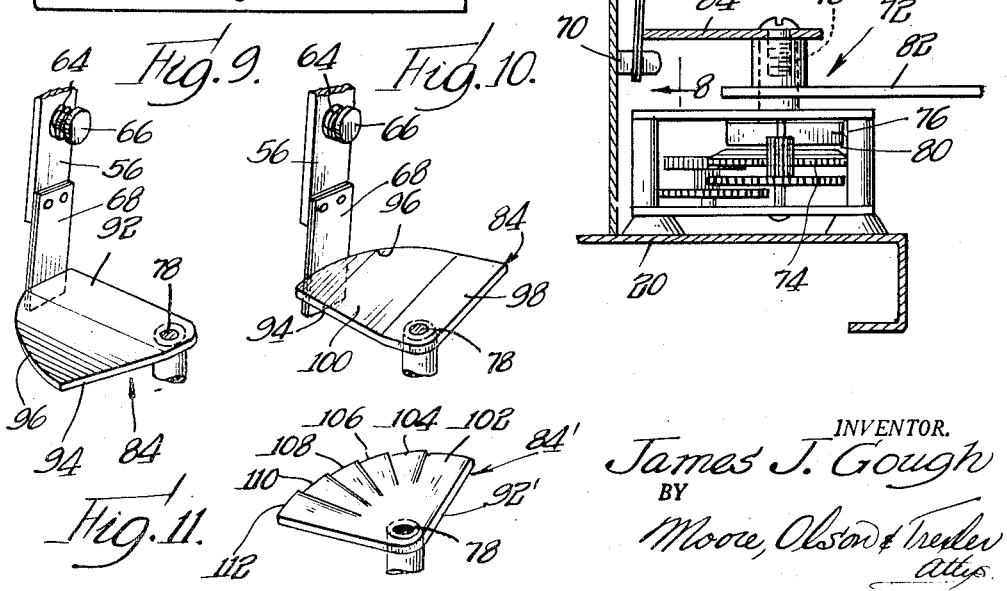
INVENTOR.
James J. Gough
BY
Moore, Olson & Trexler
Attys.

Patented Sept. 23, 1952

2,611,849

UNITED STATES PATENT OFFICE 2,611,849

TOASTER TIMER

James J. Gough, Chicago, Ill., assignor to Chicago Electric Manufacturing Company, Chicago, Ill., a corporation of Illinois Application October 4, 1947, Serial No. 777,915

8 Claims. (Cl. 219—19)

1

This invention relates to an automatic, thermally compensated toaster. Prior automatic toasters of the thermally compensated type with which applicant is familiar are quite complex and very expensive.

It is the principal object of the invention, therefore, to provide a simple, inexpensive, but rugged, thermally compensated, automatic toaster producing properly toasted successive slices.

Another object of the invention is to provide a toaster in which an inexpensive, constant speed timer or clockwork mechanism is presettable for different toasting time intervals according to the color of toast desired, and those toasting time intervals automatically varied in accordance with the temperature of the toaster so that successive slices of toast are of uniform color.

A more specific object of the invention is to provide an inexpensive, reliable, thermally compensated toaster having a toasting control means automatically latchable in toasting position by latching means which include a thermally deflectable latch releasing means cooperating with constant speed timing means automatically to vary the time of release of the latch, and the consequent termination of the toasting operation, in accordance with the changing temperature of the toaster.

Applicant has discovered that the variation in toasting interval required to obtain a uniform color of toast slices, is not at the higher temperatures a direct or linear function of the deflection of a bimetal strip which responds to the temperature of the toaster, or the toast chamber, but that the required incremental decrease in toasting interval with a given incremental increase in toaster temperature becomes less in magnitude as the temperature of the toaster reaches those higher values. It is accordingly an object of this invention to provide a thermal timer control so constructed that the incremental decrease in the toasting interval is made progressively less as the temperature of the toaster increases.

Other and further objects and advantages of the invention will be apparent from the following description when taken in connection with the accompanying drawings, wherein:

Figure 1 is a perspective view of a toaster embodying the invention;

Figure 2 is an enlarged, fragmentary view in vertical section taken substantially along the line 2—2 of Figure 1;

Figure 3 is a view in vertical section taken substantially along the line 3—3 of Figure 2;

Figure 4 is a view of a portion of the mechanism shown in Figure 3 but in a different position of operation;

Figure 5 is a still further enlarged, fragmentary view in horizontal section taken substantially along the line 5—5 of Figure 1;

Figure 6 is an enlarged fragmentary view in horizontal section taken substantially along the line 6—6 of Figure 3;

Figure 7 is an enlarged fragmentary view in vertical section taken substantially along the line 7—7 of Figure 3;

Figure 8 is a fragmentary view in vertical section taken substantially along the line 8—8 of Figure 7;

Figures 9 and 10 are fragmentary views diagrammatically illustrating the operation of certain parts of the mechanism; and Figure 11 is a perspective view of a modified form of control cam which may be used in the mechanism of Figures 1 to 10.

As shown in the drawings, the preferred embodiment selected to illustrate the invention comprises a pair of pan-shaped, sheet metal stampings forming opposed side members 2 and 4, Figures 1, 3 and 5. Spaced supports 6 of any suitable insulating material are secured in any convenient manner to the lower inturned flanges of the pans 2 and 4 to support the toaster in spaced relation upon the surface of the table on which it is used. A detachable crumb receiving tray 8 is detachably mounted in any convenient manner on the bottom inturned flanges of the pans 2 and 4 and closes the space between the flanges. The side and upper flanges of the pans 2 and 4 are formed to provide outwardly directed flanges or beads 10 interlocking with the inturned peripheral flanges or beads 12 of a central, substantially U-shaped sheet metal stamping or casing member 14. The interlocking of the flanges 10 and 12 secures the casing members 2, 4 and 14 against outward lateral displacement. At its lower end the central casing member 14 is turned inwardly as at 16, Figure 2, for fastening, as by screws or the like, to the inturned flanges 18 (one only being shown) of a sheet metal plate 20 forming a bottom plate and having a central opening therein below the toasting or heating chamber. The bottom plate is preferably formed with vertical side flanges 22 to engage and reinforce the side pans 2 and 4.

Plate-like heating elements 24, 26 and 28 cooperate with spaced transverse plates 30 (of which one only is shown) to form a pair of toasting chambers. Strip-like, bread receiving carriers or trays 32 are mounted in the toasting chambers and are secured on their forward ends to a common plate 34. The plate 34 rests against the inner surface of the forward transverse plate 30 and has outwardly pressed portions (not shown) interfitting with an elongated slot 36 in said plate 30 to guide the plate 34 in its vertical movements as it carries the bread receiving trays between an upper, non-toasting position and a lower, toasting position.

The plate 43 is secured as by bolts 38 to a sheet metal bracket 40 which bears upon the outer surface of the forward transverse plate 30 and is formed with an arm 42 projecting forwardly therefrom and through a vertical slot 44 in the forward wall of the central section 14 of the toaster casing. The arm 42 carries upon its outer end an operating knob 46 by means of which the bracket 40, the attached plate 34, and the bread trays carried thereby are depressed or carried into toasting position. Upward movement, or return, of the toast carrying trays is accomplished automatically by a spring 48 secured at its outer end to a lug 50 struck from the wall plate 30 and at its lower end to the operating arm 42.

The bracket 40 is formed with a laterally extending arm 52 which forms a keeper for engagement by latch means 54 when the arm 42 is depressed.

The latch means 54 comprises a sheet metal strip 56 having a struck out lug 58 adapted to engage over the arm 52 to hold the toast carriers in depressed position. A pin or rivet 60 is secured to the wall plate 30 and passes through an enlarged opening 62 in the strip 56 to form a pivot for the strip. A coiled spring 64 encircles the pin and bears at one end against the strip and at the other end against a nut 66 threaded on the outer end of the pin 60. The spring 64 urges the strip 56 in a counter-clockwise direction to a vertical position in which the latch lug 58 engages over the arm 52 and permits the strip 56 to be moved in a clockwise direction so that the arm 52 may be released from the latch lug 58.

The latching means 54 also comprises temperature responsive means such as a bimetallic strip 68 riveted at its upper end to the lower end of the strip 56 and dependent therefrom. The free end of the strip is guided toward and from the plate 30 by spaced lugs 70 struck from the plate 30. The bimetallic strip is so mounted that as the temperature increases in the space between the wall plate 30 and the front wall of the toaster the bimetallic strip curls or deflects outwardly away from the wall plate 30.

The latch means 54 is operated to release the toast carrier at the end of each toasting operation by a timer mechanism 72. This timer mechanism includes a constant speed clock mechanism of any suitable conventional structure having a series of intermeshing gears 74 controlled by the usual escapement, a driving spring 76 connected to the usual setting shaft 78, and a friction clutch means 80 connecting the setting shaft to the chain of gears. The timer mechanism 72 also comprises a setting lever 82 fixed to the setting shaft 78 and a timer control cam 84 also secured to the setting shaft 78. The setting lever 82 extends from the setting shaft 78 forwardly of the toaster through a horizontal slot 86 in the forward wall of the toaster casing section 14 at the lower end thereof.

An adjustable, time or color setting gauge comprises a sheet metal strip 88 having an operating knob 90 and being slidably mounted in any convenient manner in the slot 86. The strip 88 is provided with a suitable pointer cooperating with the usual time or color scale inscribed adjacent the slot 86.

It will be evident that adjustment of the strip 88 to the left allows a greater movement of the setting lever 82 and hence lengthens the toasting time, while movement of the strip 88 to the right restricts the movement of the setting lever 82 and thereby shortens the toasting time.

The cam 84 is preferably segmental in form and of constantly decreasing radius from the radial edge 92 to the radial edge 94. The cam 84 is so proportioned that when the toaster is cold the peripheral edge 96 of the cam engages the bimetallic strip 68 at a point adjacent the edge 92 of the cam. It will be evident that as the toaster heats up and the bimetallic strip 68 deflects outwardly, or toward the center of the cam 84, it will be engaged by the peripheral edge 96 of the cam at a point farther away from the radial edge 92 and closer to the radial edge 94.

Preferably, the cam 84 is also formed to provide a flat horizontal section 98 and an inclined plane section 100. As the bimetallic strip heats up, the point of engagement between it and the cam section 100 will not only move toward the radial edge 94 of the cam, but also will move upwardly relative to the bimetallic strip and toward the pivot pin 60 of the latch lever 56.

As shown in Figure 11, a modified cam 84' may be provided between its radial edges 92' and 94' with a series of vertically displaced edge portions or steps 102 to 112, which stepped portions will cause the point of engagement between the bimetallic strip and the cam to be displaced vertically toward the pivot pin 60 of the latch bar as the bimetallic strip heats up.

Electric current for energizing the toasting elements 24 to 28 is supplied to the toaster through the usual two-conductor cable or cord (not shown). The cord conductors 114 (Figure 3) are connected to blades 116 and 118 of the usual spring-opened switch mounted on a bracket 120 secured to the forward transverse wall plate 30. The operating blade 116 of this switch extends to a position in the path of the operating arm 42 so that the switch is closed when the toast carrier trays 32 are depressed or brought into toasting position. The toaster is therefore energized simultaneously with the movement of the toast carrier trays to toasting position and it is deenergized as the trays start to move under the force of the spring 48 from the toasting toward the non-toasting position.

The operation of applicant's toaster is as follows: The toast carrier or trays 32 being in their upper, non-toasting position, in which position they are held by spring 48, the clock setting lever 82 is moved to the left along slot 86 until it engages and is stopped by the preset, limit stop or gauge 88. The gauge 88 is, of course, preset for dark or light toast or for any color of toast therebetween as the user may desire. When the setting lever 82 is moved to the left the clock spring 76 is thereby wound to initiate the operation of the clock mechanism and the cam 84 rotated in a clockwise direction from a latch-releasing position as shown in full lines in Figure 5 to a timing position such as shown in dotted lines in said figure. The toast carrier is then immediately lowered by depression of the knob 46 and is latched in that position by the springing of the latch lug 58 over the keeper 52. The running of the clock mechanism moves the lever 82 to the right along slot 86 and rotates the cam 84 in a counter-clockwise direction. During the subsequent toasting operation the bimetallic strip 68 heats up and is deflected at its lower end toward the axis of the cam 84. As the cam 84 is rotated in a counter-clockwise direction its peripheral edge 96, of increasing radius in the counter-clockwise direction, approaches the continuously deflecting bimetallic strip. The toaster being cold at the beginning of the toasting of a first slice or pair of slices, the strip will not be engaged by the peripheral edge 96 of the cam until the cam has substantially completed its return movement and the cam will, therefore, engage the strip at a point along the peripheral edge 96 relatively adjacent the radial edge 92 as indicated, for example, in Figure 9. Thereafter a slight continued rotation of the cam will be sufficient to cause inward movement of the strip toward the wall plate 30 and the consequent swinging of the latch strip 56 in a clockwise direction, as shown in Figure 7, to release the latch lug 58 from the keeper 52, thereby permitting the spring 48 to return the toast carriers to their upper or non-toasting position and the consequent separation of the switch plates 116 and 118 to deenergize the heating elements.

Setting of the toaster for the second or successive slices, or pair of slices, is accomplished in the same manner, namely, the lever 82 is first moved to the left along slot 86 until it is stopped by the gauge 88 (the position of which is not changed) and the knob 46 depressed to energize the heating elements and position the toast carriers in toasting position. During the toasting of the second or successive slices the toaster will be at a higher initial temperature so that the bimetallic strip is initially deflected toward the axis of the cam 84 and will, being further heated during the toasting operation, engage the peripheral edge 96 of the cam at a point farther from the radial edge 92 and nearer to the radial edge 94 as the cam is returned in a clockwise direction by the clockwork mechanism. The time of the toasting operation will, therefore, be shortened by reason of the earlier engagement of the bimetallic strip with the peripheral edge 96 of the cam. It will be evident that this advancement of the point of engagement of the bimetallic strip with the cam is determined by the deflection of the bimetallic strip and consequently by the temperature of the toaster.

A flat cam of varying radius will provide properly toasted slices for successive operations but the color of the slices toasted by immediately successive operations may not always be uniform. Applicant has found, however, that a more perfect uniformity in color between slices toasted by successive operations of the toaster may be accomplished by providing the cam with the inclined section 100 or the stepped sections 104 to 112. These sections cause the point of engagement of the bimetallic strip with the cam to be also displaced vertically toward the pivot axis of the latch strip 56 as it is displaced toward the radial edge 94, and away from the radial edge 92. It will be evident that for any given temperature the deflection of the bimetallic strip relative to the plane of the latch strip 56 is greatest at the free end thereof and is progressively less in the direction of its fixed end. The relative displacement of the cam edge vertically of the bimetallic strip therefore allows a greater deflection of the bimetallic strip prior to the release of the latch, i. e., the incremental decrease in the toasting time interval with a given incremental increase in temperature is less than in the case of a flat cam. When a flat cam is used, the shortening of the toasting time interval with increasing temperature is determined solely by the time rate of lateral deflection of the section of the strip lying in the plane of the cam and hence is determined solely by the heat-up, toaster temperature characteristic, deflection curve of the bimetal strip. A twisted, or stepped, cam because it reduces the incremental decrease in the toasting time interval with a given incremental increase in toaster temperature, provides simple means for compensating for the tendency of the control to cause underheating of slices at the higher toaster temperatures, caused possibly by the fact that the toast color-toaster temperature curve of the toaster does not parallel the toaster temperature, characteristic curve of the bimetal strip at the higher toaster temperatures.

It will be evident that the compensation effected by the cam may be varied, if necessary, for different toasters of the same or different structures by variation or adjustment of the degree or direction of twist of the inclined cam or by variation of the height or directions of the steps of the stepped cam.

It will be seen from the foregoing that applicant has provided a simple, inexpensive but rugged, thermally compensated, automatic toaster which insures properly toasted successive slices and includes constant speed timer or clockwork mechanism which is presettable for different time intervals according to the color of toast desired and is latched in toasting position by latching means which include a thermally deflectable latch releasing means varying the time of release of the latch to provide, by successive operations, a series of toast slices of uniform color.

It will be obvious that changes may be made in the form, construction and arrangement of the parts without departing from the spirit of the invention or sacrificing any of its advantages, and the right is hereby reserved to make all such changes as fairly fall within the scope of the following claims.

What I claim is:

1. In a timing mechanism adapted to terminate the operation of other mechanism after a time interval varying with the ambient temperature, two position control means operable to a first position to render the said other mechanism ineffective and operable to a second position to render the same effective, manually operable means for moving said control means from the first position to the second position, latch means for holding said control means in the second position, means automatically returning the control means from the second position to the first position to terminate the operations of said other mechanism upon release of said latch means, a constant speed clock presettable for a selected time period, shiftably mounted latch releasing means including a thermo-responsive member subject to an ambient temperature, said member being mechanically fixed to said latch means to release said latch means, and means driven by said clock and positioned for operative engagement by said thermally responsive member to move said member and thereby release said latch means, and terminate the operations of said other mechanism during said selected time period and after a time interval which varies with the ambient temperature.

2. In a timing mechanism adapted to terminate the operation of other mechanisms after a time interval varying with the ambient temperature, two position control means operable in a first position to render said other mechanism ineffective and operable in a second position to render the same effective, manually operable means for moving said two position control means from the first position to the second position, latch means for holding said control means in a second position, means automatically returning the control means from the second position to the first position upon release of said latch means, a constant speed timer, a cam driven by said timer, and latch releasing means including an expandible thermally responsive member fixed to said latch means and expandible into engagement with the surface of the cam for releasing said latch means after time periods varying with the ambient temperature.

3. In a timing mechanism adapted to terminate the operation of other mechanisms after a time interval varying with the ambient temperature, a shiftably mounted control member operable from a first position rendering said other mechanism ineffective to a second position rendering the same effective, and means normally urging said control means from a second position to a first position, a shiftably mounted latch bar engageable with said control member to retain said member in second position, means normally urging said latch bar into latching position, a constant speed timer including a cam driven by said timer, a bimetal strip operatively connected to said latch bar to shift said latch bar to latch releasing position and deflectable relative to the path of the cam to engage and be operated by said cam to shift said bar, said bimetal strip being mounted relative to said cam to cause the strip on deflection thereof to engage the surface of the cam at different points determined by the ambient temperature.

4. In a heater, a casing, a carrier for an object to be heated shiftable from a non-heating position to a heating position relative to said casing, releasable latch means for retaining said carrier in heating position, means for automatically moving said carrier from heating to non-heating position upon release of said latch means, a timer, a rotatable cam driven by said timer, said cam having a cam surface of varying radius, a pivoted latch releasing bar, a bimetal strip secured at one end to said bar and positioned for movement toward and from said cam surface of varying radius on increase and decrease in the heater temperature whereby to connect said bar to said cam for actuation thereby at angular positions of rotation varying with the heater temperature.

5. In a timing mechanism adapted to terminate the operation of other mechanisms after a time interval varying with the ambient temperature, two position control means normally urged from a first position rendering said other mechanism effective to perform an operation to a second position rendering said mechanism ineffective to perform an operation, manually operable means for moving said control means from the second position to the first position, a shiftably mounted latch bar releasably retaining said control means in the first position, a bimetal strip fixed to said bar for shifting said bar to release said control means, a constant speed timer presettable for different operating time periods, said timer having a driven shaft rotated in one direction on presetting of said timer and in the opposite direction during operation of said timer, a cam mounted on said shaft for rotation therewith and adapted to engage and actuate said strip on rotation of said shaft in said opposite direction to release the latch bar, said strip and cam being mounted to cause the strip to engage the cam at angular positions of rotation varying with the ambient temperature.

6. In a toaster, control means urged in a direction to render said toaster ineffective to perform a toasting operation and operable in an opposite direction to render the toaster effective to perform a toasting operation, a latch keeper carried by said control means, a latch bar pivotally mounted intermediate its ends, said latch bar having at one end a latching projection for engaging said keeper releasably to retain said control means in a position for rendering the toaster effective to perform a toasting operation, a bimetal strip fixed to the other end of said latch bar and deflectible on change in toaster temperature, a constant speed timer including a cam rotated thereby in a plane transverse to the plane of the bimetal strip, said cam having a nonplanar cam surface of varying radius to engage the strip as the cam is rotated by the timer and the strip is deflected in response to change in the toaster temperature whereby to pivot said latch bar to latch-releasing position when the bimetal strip engages the cam.

7. In a toaster as set forth in claim 6 wherein the timer is provided with means for presetting same for different time periods of operation and the cam is mounted for disengagement from the bimetal strip when the timer is preset and to engage the strip as the cam is rotated in the opposite direction under the control of the timer.

8. In a toaster as set forth in claim 6 wherein the cam surface is formed to engage the bimetal strip at a point varying in distance from the pivot axis of the latch bar in accordance with the temperature of the toaster and the rotation of the cam.

JAMES J. GOUGH.

REFERENCES CITED

The following references are of record in the file of this patent:

UNITED STATES PATENTS

| Number | Name | Date |
| --- | --- | --- |
| Re. 18,923 | Harris | Aug. 22, 1933 |
| 1,665,735 | Forbes | Apr. 10, 1928 |
| 2,099,210 | Ireland | Nov. 16, 1937 |
| 2,112,422 | McCullough et al. | Mar. 29, 1938 |
| 2,129,360 | Purpura | Sept. 6, 1938 |
| 2,152,100 | Scharf | Mar. 28, 1939 |
| 2,207,946 | Sardeson | July 16, 1940 |
| 2,207,947 | Sardeson | July 16, 1940 |
| 2,253,637 | McCullough | Aug. 26, 1941 |
| 2,266,014 | Erickson | Dec. 16, 1941 |